United States Patent
Pecone et al.

[11] Patent Number: 6,044,207
[45] Date of Patent: Mar. 28, 2000

[54] ENHANCED DUAL PORT I/O BUS BRIDGE

[75] Inventors: Victor Key Pecone, Lyons; Edward Stokes Quicksall, Longmont, both of Colo.

[73] Assignee: Adaptec, Inc., Milpitas, Calif.

[21] Appl. No.: 08/821,783

[22] Filed: Mar. 21, 1997

[51] Int. Cl.[7] .................................................... G06F 13/40
[52] U.S. Cl. ........................... 395/309; 395/308; 711/149
[58] Field of Search .................................. 395/306–309; 711/147–149

[56] References Cited

U.S. PATENT DOCUMENTS

| | | | |
|---|---|---|---|
| 4,912,633 | 3/1990 | Schweizer et al. | 395/290 |
| 4,935,868 | 6/1990 | DuLac | 395/306 |
| 5,414,814 | 5/1995 | McKim | 395/821 |
| 5,499,344 | 3/1996 | Elnashar et al. | 395/308 |
| 5,548,730 | 8/1996 | Young et al. | 395/280 |
| 5,594,886 | 1/1997 | Smith et al. | 711/136 |
| 5,644,729 | 7/1997 | Amini et al. | 395/308 |
| 5,721,839 | 2/1998 | Callison et al. | 395/308 |
| 5,732,223 | 3/1998 | Moore et al. | 395/872 |

OTHER PUBLICATIONS

PCI Special Interest Group: PCI to PCI Bridge Architecture Specification, Revision 1.0, Apr. 5, 1994, pp. 1–7.

Primary Examiner—Glenn A. Auve
Assistant Examiner—Sumati Lefkowitz
Attorney, Agent, or Firm—Duft, Graziano & Forest, P.C.

[57] ABSTRACT

An enhanced performance dual port I/O bus bridge to connect a first I/O bus of bandwidth B and a second like-type I/O bus of bandwidth B with a simultaneously bi-directional data path operating at a bandwidth of at least B and typically at a bandwidth of from 2B to 4B. The enhanced dual port I/O bus bridge includes a first bridge interface and a second bridge interface to a first I/O bus and a second I/O bus respectively. The bridge also includes a first data access path buffering data and having a bandwidth of at least B between the first bridge interface and a data cache, and a second data access path buffering data and having a bandwidth of at least B between the second bridge interface and the same data cache. The data cache can be a RAID type cache. The enhanced I/O bus bridge is operated asynchronously by a means for controlling simultaneous bi-directional data flow between the first bridge interface and the second bridge interface by way of concurrent dual port access to the shared data cache.

20 Claims, 3 Drawing Sheets

ENHANCED DUAL PORT I/O BUS BRIDGE

FIELD OF THE INVENTION

This invention relates to the field of high-performance high-bandwidth Input/Output (I/O) buses, and in particular to a high-performance dual port bridge system with bridge cache between like-type I/O busses to increase the data transfer bandwidth across like-type I/O buses.

PROBLEM

Interconnecting two like-type high-performance high-bandwidth I/O buses with an I/O bus bridge is a difficult problem if the I/O bus bridge is expected to perform at or above the throughput and bandwidth capacity of the attached I/O busses. For purposes of the remainder of this document, references to "bridge" or any type of "I/O bus bridge" refer to the interface or connection path between two independent busses. Among the reasons I/O bus bridges are desirable includes, but is not limited to, the expanding number of peripheral devices available to Personal Computer (PC) users, the increasing demand for large amounts of inexpensive disk space made available by disk arrays, and the increasing demand for access to high-bandwidth video and other graphic intensive applications. Because there are physical limits to the number of devices a single I/O bus can support, multiple I/O buses can be bridged together to support the increasing demand for additional bus access. However, there are several related reasons why existing I/O bus bridges between like-type I/O busses perform below the maximum bandwidth capacity B of a given I/O bus. First, existing I/O bus bridges support two way traffic across the bridge but in only one direction at a time in the manner of a one-lane bridge. Second, the data crossing existing I/O bus bridges is double buffered for the sequential write to cache and the read from cache operations for each transfer across the bridge. Thus, even if the total available bandwidth of a given I/O bus is B, the effective bandwidth is ½B because there is sequentially a read and a write across the I/O bus bridge for each one way data transfer between I/O busses. For this reason alone there exists an ongoing need for a high-performance low latency I/O bus bridge between like-type I/O buses that performs at least at a bandwidth capacity B if not at an increased capacity of 2B or greater. A solution to this problem has heretofore not been known prior to the invention as disclosed and claimed herein.

To further highlight the problems stated above in view of an existing I/O bus technology, the remainder of this section introduces one I/O bus type that is widely used in existing Personal Computers (PC's) called the Peripheral Component Interconnect (PCI) bus, also known and used as a system bus, a local bus, and a mezzanine bus. Other names for I/O buses generally, include expansion bus, channel, and I/O channel. Although one preferred embodiment of the present invention is an enhanced PCI-to-PCI bridge for use in connecting two PCI busses, the invention herein is not limited to PCI bus architectures alone.

A PCI bus is a 32-bit or 64-bit wide high-speed data path interconnection that is ideally suited for handling the data traffic required for high-resolution, full-color, full-motion video, 3-dimensional graphics, and other multimedia presentations, all in multiple windows. One architectural advantage to a PCI bus is that it is not tightly coupled to the local processor complex bus of a specific Central Processing Unit (CPU). Instead, a PCI bus connects high-speed peripherals to the CPU and on-board memory through a processor-independent bridge that facilitates high data transfer speeds and backward compatibility with historically used I/O busses including the Industry Standard Architecture (ISA), Enhanced ISA (EISA), and Micro Channel Architecture (MCA). For example, a 32-bit PCI bus operating at 33 MHZ yields a 132 Mbps peak throughput rate.

Another advantage of a PCI bus is its peripheral upgrade transparency and expandability. A computer user can take advantage of the latest modem technology, network card, or video capture PCMCIA cards with the ease of plug-and-play installation. Plug-and-play installation is accomplished by including configuration specifications in the on-board memory of the primary CPU so that the peripheral installation information is readily available to the system during the boot-up phase, without the need for operator intervention.

Another advantage of a PCI bus is a built-in buffer that isolates the CPU from specific knowledge of or management responsibilities for any peripheral attached to the PCI bus. The PCI's buffer enables the PCI controller to independently store data being written to the peripheral so that the CPU can turn immediately to other tasks without having to wait for verification of a completed transfer.

Components and/or peripherals that are attached to a PCI bus are referred to as PCI agents and each PCI agent contains a 256 byte configuration space. Among other uses, the CPU uses the information in the configuration space to set PCI agent memory and I/O space base addresses. This dynamic address assignment eliminates the need for address select jumpers that are prevalent in older I/O sub-system designs, thus further automating the system configuration by way of the system's Basic Input Output System (BIOS) without a need for operator intervention.

The PCI bus is designed to drive ten unit loads, where a unit load is a single PCI compliant chip or expansion slot connection. Since a card in an expansion slot also contains a PCI compliant chip, each occupied expansion slot consumes two unit loads. If additional expansion slots are desired, an additional independent secondary PCI bus can be hierarchically bridged to the primary PCI bus by way of a PCI-to-PCI bridge also known as a PCI bus bridge. A PC bridge is an integrated circuit implementation that connects two independent PCI busses and whose primary function is to transfer data between to PCI busses. A PCI bus bridge is considered another PCI agent with respect to the two attached PCI buses and consumes one unit load on the primary PCI bus.

However, one problem is that existing PCI bus bridges are unidirectional bridges connecting two simultaneously bi-directional pathways. Individual transmissions must take turns crossing the bridge because only one transmission can pass in only one direction on the bridge at one time. For this reason, a PCI bus bridge itself is a data transfer bottleneck between the host CPU and its peripherals that are attached to the respective PCI busses.

One solution to the one lane PCI bus bridge bottleneck is to eliminate the bridge between two independent PCI busses and connect each independent PCI bus directly to the CPU's local processor complex bus. However, such a configuration severely limits the local CPU bus due in part to the overloading of simultaneous host and peripheral interface accesses to system memory to an extent that limits overall system performance. For this reason the PCI-to-PCI bridge configuration is a better solution to the overall bus expandability problem and the efficiency of the bridge is the only performance problem that requires a solution.

One solution to the PCI bus bridge double buffering delay problem is to implement an infinite size Random Access Memory (RAM) data cache that eliminates any need for data transfers across a bus from, for example, a disk to a CPU for processing. However, this is an impractical solution due to the orders of magnitude of difference in size and cost between RAM memory and disk peripheral memory. Thus, solving the problem of developing a more efficient I/O bus bridge is a more realistic problem to solve.

For the reasons, there exists a long felt need for an enhanced high-performance low latency I/O bus bridge system that performs at least at a bandwidth capacity B if not at an increased capacity of 2B or greater, without adversely impacting transparent expandability of an I/O bus system, I/O bus bandwidth, host CPU performance, or overall system performance.

SOLUTION

The above identified problems are solved and an advancement achieved in the field in view of the enhanced dual port I/O bus bridge of the present invention. The enhanced dual port I/O bus bridge connects a first I/O bus of bandwidth B and a second like-type I/O bus of bandwidth B with a simultaneously bi-directional data path operating at a bandwidth of at least B and typically at a bandwidth of from 2B to 4B. The enhanced dual port I/O bus bridge includes a first bridge interface and a second bridge interface to a first I/O bus and a second I/O bus respectively. The bridge also includes a first data access path having a bandwidth of at least B between the first bridge interface and a data cache, and a second data access path having a bandwidth of at least B between the second bridge interface and the same data cache. In a preferred embodiment the data cache is a RAID type data cache. The enhanced I/O bus bridge is operated asynchronously by a means for controlling simultaneous bi-directional data flow between the first bridge interface and the second bridge interface by way of concurrent dual port access to the shared data cache.

In a preferred embodiment, the enhanced I/O bus bridge simultaneously reads and writes data with a dual port access shared data cache and either a first bus to bridge interface and/or a second bus to bridge interface.

In an alternative embodiment, the enhanced I/O bus bridge of the preferred embodiment itself can also master a data read and data write directly to a slave memory interface of an attached I/O bus by way of a Direct Memory Access (DMA) engine.

In either embodiment, a backup power supply can be attached to the data cache and the enhanced I/O bus bridge itself to protect against lost data in the event of a primary power supply failure occurs.

DETAILED DESCRIPTION

Figure 1:
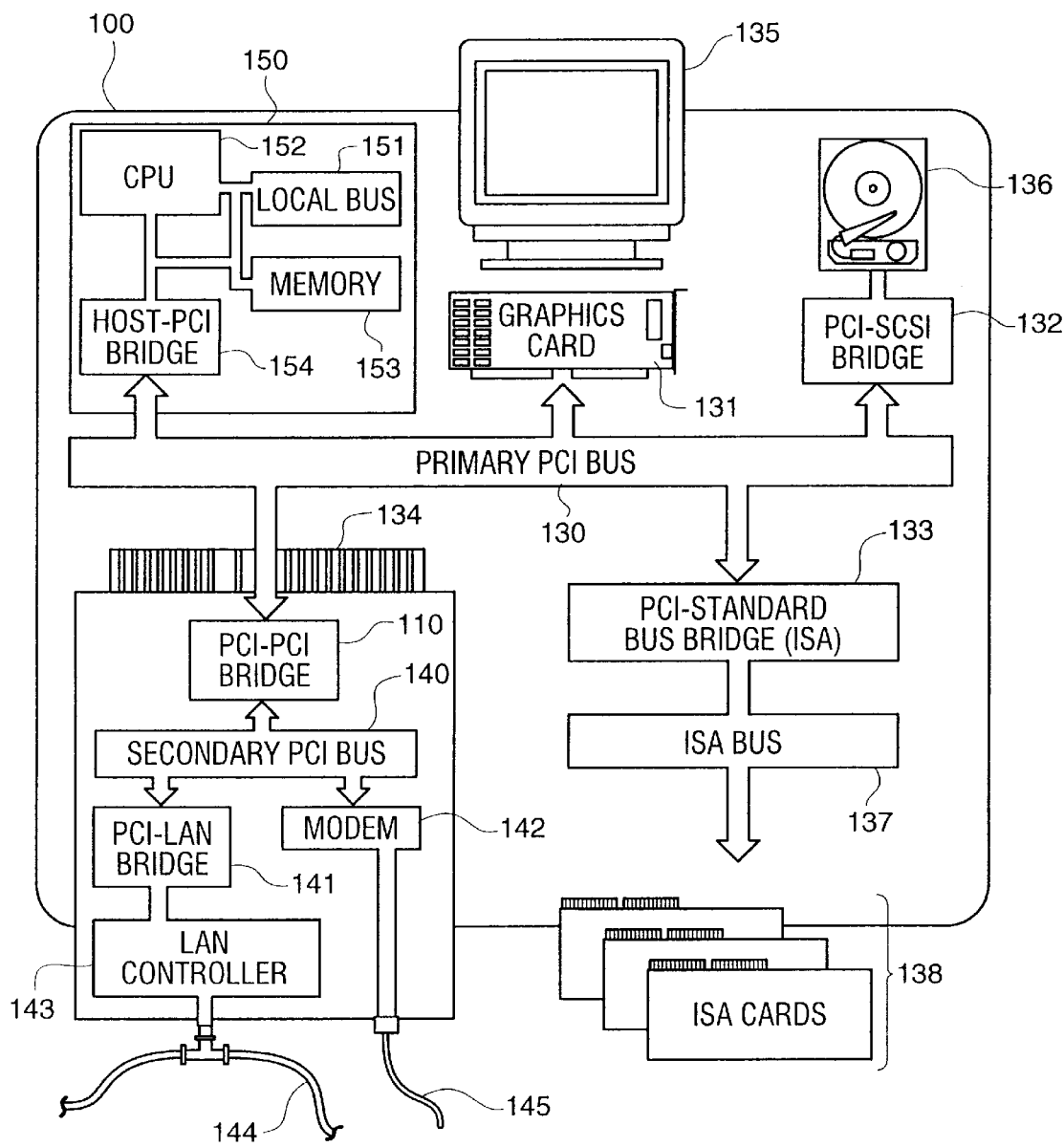
FIG. 1 illustrates a system level view of the enhanced I/O bus bridge in a Personal Computer configuration.
Figure 2:
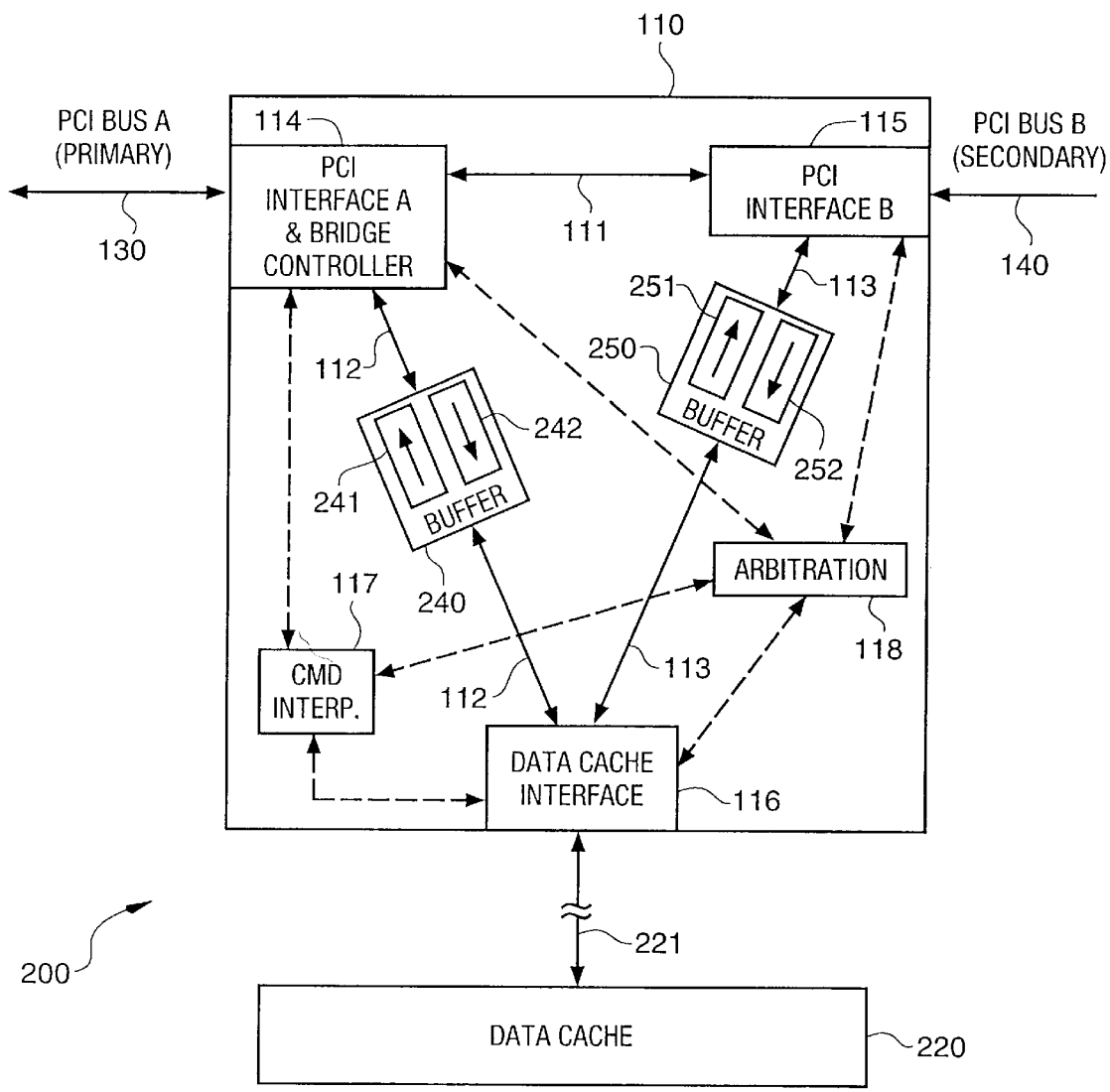
FIG. 2 illustrates the enhanced I/O bus bridge in block diagram form.

Enhanced I/O Bus Bridge Architecture—FIGS. 1–2

FIG. 1 illustrates a system level block diagram view of the enhanced I/O bus bridge in a PC implementation. FIG. 2 illustrates the details of the enhanced I/O bus bridge in block diagram form. The figures are for example purposes only and are not intended to imply any operational or architectural bus-type limitation on the enhanced I/O bus bridge concept itself. The preferred embodiment of the enhanced I/O bus bridge joins two like-type busses and the PCI bus architecture is a concrete example of where the enhanced I/O bus bridge might be implemented.

An I/O bus bridge is an interface bridge between a host CPU and a plurality of peripheral devices commonly found in a PC environment. For example, the enhanced PCI bus bridge is well suited as an I/O bus bridge between a host CPU interface and any one of several peripheral agents attached to a PCI bus including, but not limited to, an external host interface, a foreign bus-to-PCI bridge, a peripheral device, a PCI compliant electronic component, an expansion slot integrated circuit board, or a high-performance external storage system such as a Redundant Array of Independent Disks (RAID) configuration. For purposes of this disclosure, RAID technology refers to any of the family of methods and apparatus used for purposes including, but not limited to, managing multiple independent disks or other random access memory or partitions thereof in a manner that achieves a desired level of availability, efficiency, capacity, performance, and economic cost of storing large quantities of readily available data in a data storage system.

In FIG. 1, the primary components of the PC motherboard system 100 include, but are not limited to, a host processor complex 150 and a primary PCI bus 130. Host processor complex 150 includes a local processor complex bus 151 that operatively supports communications between processing complex components including, but not limited to, a Central Processing Unit (CPU) 152, CPU memory 153, and a PCI-to-host bridge 154. PCI-to-host bridge 154 is the direct connection to the primary PCI bus 130 so that the host processor complex 150 can have direct access to high-speed peripherals connected directly or indirectly to the primary PCI bus 130.

The primary PCI bus 130 is designated as primary because it is the only PCI bus that is directly connected to the host processor complex 150. All other PCI busses are considered secondary busses because they are indirectly connected to the host processor complex 150 by way of a PCI-to-PCI bus bridge to the primary PCI bus 130.

The primary PCI bus 130 supports a plurality of PCI agents 131–134 subject to the unit load limitations for the bus. An agent can be any one of several types that include but are not limited to, an external host interface, a foreign bus-to-PCI bridge, a peripheral device, a PCI compliant electronic component, an expansion slot integrated circuit board, and a RAID. Specifically, the PCI agents 131–134 attached to primary PCI bus 130 include a video graphics card 131, a PCI-to-Small Computer System Interface (SCSI) bridge 132, a PCI-to-Industry Standard Architecture (ISA) bridge 133, and a multi-function PCI daughterboard card 134. The video graphics card 131 supports a high-resolution display monitor 135. The PCI-to-SCSI bridge 132 supports connectivity to at least one disk drive 136 on a SCSI bus. The PCI-to-ISA bridge 133 supports connectivity to at least one ISA expansion card 138 on an ISA bus 132. The multi-function PCI card 134 supports connectivity to multiple agents 141–142 on a secondary PCI bus 140. The secondary PCI bus 140 is connected to the primary PCI bus 130 by a PCI-to-PCI bridge 110. PCI-to-PCI bridge 110 is the subject of the present invention and details of the PCI-to-PCI bridge 110 are disclosed in the text accompanying FIG. 2.

One of the agents connected to the secondary PCI bus 140 is a PCI-to-Local Area Network (LAN) bridge 141. The PCI-to-LAN bridge 141 supports connectivity to a LAN controller 143 and the LAN cabling 144. Multiple network accessible peripherals and/or computers can be attached to the LAN cabling 144. Another of the agents connected to the secondary PCI bus 140 is a Modulator-DEModulator (MODEM) that is connected to a twisted pair, coaxial cable, or other outside telecommunications link 145. Secondary PCI bus 140 can be considered a transparent extension of primary PCI bus 130 due to the enhanced PCI bridge 110 therebetween. There is no difference between the type of agent a primary PCI bus or a secondary PCI bus can support.

FIG. 2 illustrates the details of the PCI bus bridge 110 in block diagram form. The PCI bus bridge 110 includes a first PCI interface 114 and a second PCI interface 115 to the primary PCI bus 130 and secondary PCI bus 140 respectively. The first PCI interface 114 can also include or supply control access to a high-level embedded CPU or bridge controller whose function is to identify and coordinate simultaneous I/O transactions across the PCI bus bridge 110 and to communicate read/write commands to command interpreter 117 for actual read/write control of data to and from data cache 220. Both PCI interfaces provide write posting and read pre-fetching buffers for all PCI bus bridge transactions to facilitate coherency and consistency of bi-directional transactions across the PCI bus bridge 110.

Command path 111 connects the first PCI interface 114 and the second PCI interface 115. The command path 111 carries the read/write transmission information only between the primary PCI bus 130 and the secondary PCI bus 140. First data path 112 and second data path 113 connect a data cache interface 116 to the first PCI interface 114 and the second PCI interface 115 respectively. The first data path 112 and second data path 113 carry the data only for each read/write transmission between the primary PCI bus 130 and the secondary PCI bus 140. Although the first data path 112 and second data path 113 are ideally the same word-size as the attached busses 130 and 140, the first data path 112 and the second data path 113 can independently buffer (240, 250) incoming data from the respective busses as needed to facilitate the most efficient write operation of a burst of incoming data to data cache 220. Key to the enhanced I/O bus bridge system 110 is that the first data path 112 and second data path 113 are independent read/write paths to and from data cache 220. This dual port access to data cache 220 supports simultaneous concurrent reads and writes to and from data cache 220 that results in at least a bandwidth capacity B equal to the attached busses. Typically a doubling or quadrupling of the bandwidth capacity is realized to 2B or 4B beyond the bandwidth capacity B of the attached busses.

A single programmable arbitration controller 118 can optionally be implemented to resolve timing, interrupt, and/or resource access conflicts that occur between any of the PCI bus bridge 110 devices including the first PCI interface 114, the second PCI interface 115, the data cache interface 116, and the command interpreter 117. The arbitration control can be distributed across individual coordinated arbiters across each enhanced I/O bus bridge component. Timing, however, is based on a common clocking referenced by the enhanced I/O bus bridge 110, the primary PCI bus 130, and the secondary PCI bus 140.

Data cache interface 116 is a multipurpose memory interface that primarily supports dual port simultaneous independent read/write memory access to data cache 220. The data cache interface 116 takes timing off an independent memory clock and operates asynchronously with respect to primary PCI bus 130 and secondary PCI bus 140 sides. The interface can be one of the points of support for fault tolerant features including battery backup as needed for primary power failures. The data cache interface 116 in the preferred embodiment supports Error Correction Coding (ECC) and a shadow memory bank option. The ECC solution includes 8 syndrome bits across a 64 bit word with 1 bit error correction and multiple bit detection per 64 bit word. The shadow memory bank can be a RAID-1 type mirroring where the effective memory data cache size divides the total available memory by two.

In one preferred data cache interface 116 embodiment, support for the more robust RAID-5 Exclusive-OR (XOR) type parity can be implemented as an alternative and inherently independent type of memory shadowing. In summary, the contents of any one block of data in a partition of the total data cache memory area can be regenerated from the contents of corresponding blocks in the remaining memory area by performing an XOR of the individual strips of data around the target block. The RAID-5 XOR parity technique can be implemented at a lower quantity of memory cost than with bit for bit memory mirroring, and is a technique well known in the data redundancy art.

Data cache 220 is operatively connected to the enhanced PCI bus bridge by cache interface lead 221. The data cache 220 is a standard off-the-shelf synchronous data memory bank. In the preferred embodiment, data cache 220 is an Error Correction Code (ECC) Dynamic Random Access Memory (DRAM), preferably a Synchronous DRAM (SDRAM) 8 byte/72bit Dual In-line Memory Module (DIMM) memory. The data cache 220 can be configured in a single memory bank, multiple shadowed memory bank, or RAID-5 XOR parity configuration. The data cache 220 can also be local to and exclusively used only by the enhanced PCI bus bridge 110, or the data cache 220 can be remote from and shared by foreign components other than the enhanced PCI bus bridge 110. If ECC techniques are implemented, the solution can include at least 8 syndrome bits across a single 64 bit word path to support multiple bit error detection and at least 1 bit error correction.

The command interpreter 117, also known as the command sequence controller or command executer, executes memory access commands issued by a high-level embedded bridge controller. Commands can be executed as delivered by the high-level embedded bridge controller or instructions for multiple block moves can be queued by the high-level embedded bridge controller and the command interpreter 117 can be instructed to execute from the command queue stored in SDRAM memory. The command interpreter 117 controls low level memory to memory XOR and non-XOR block moves from multiple sources to single destinations, in addition to chain list moves, check for zero's functions, and ECC detection and correction functions.

In one alternative embodiment, a backup power supply can be attached to the data cache 220 and enhanced PCI bus bridge 110 to protect against lost data in the event of a primary power supply failure occurs. In a preferred embodiment, the backup power supply interface is non-corruptive to the data contents of data cache 220 when active or during the transition between standby and/or active status. One backup power supply alternative is to require independent power planes for the I/O to data cache 220 to allow data cache 220 to receive backup power while the enhanced PCI bridge 110 is without power. Another backup power supply alternative is to implement a SUSPEND state for the enhanced PCI bridge 110 that is asserted in the event of a non-deterministic power failure to allow data cache 220 to properly refresh.

In the preferred PCI bus bridge embodiment, the primary PCI bus 130 and the secondary PCI bus 140 operate at or about a 133 Mbyte/second communication rate with the local bus 151. The processor complex local bus 151 typically operates at or about 100–400 Mbyte/second. One key benefit of the enhanced PCI bridge 110 is that it operates at least at the same bandwidth capacity B as the PCI buses 130 and 140 connected thereto. That is, where the processor complex 150 is operatively connected to only a primary PCI bus 130 rather than to more than one PCI bus simultaneously, the enhanced PCI bus 110 and its supporting data cache 220, assuming a 66 MHZ×8 byte SDRAM interface, can operate at or about a rate of 533 Mbytes/second that is a bandwidth rate of 4B or four times the PCI bus bandwidth. Thus, the enhanced PCI bus bridge 110 is not a limiting factor in the bandwidth capacity of a PCI bus configuration regardless of the non-burst, large burst, or small burst transaction preference between the processor complex 150 and any one or multiple of the PCI agents 131–134 and/or 141–142.

In an alternative PCI bus bridge embodiment, the PCI bus bridge 110 includes a Scalable Coherent Interface (SCI) directly coupled to the high-level embedded bridge controller to support bridge sub-system clustering for fault tolerant/fail-over coherent memory sharing for PCI hosts. The SCI interface includes Direct Memory Access (DMA) engine capability to master data transfers directly from a host PCI interface on the primary PCI bus side. The secondary PCI bus side would remain substantially as disclosed in FIGS. 1–2. In this alternative embodiment, data from the direct connect host on the primary PCI bus side would transfer directly from a host cache to the data cache 220 in addition to the reverse direction from the data cache 220 to the host memory of the direct connect host on the primary PCI bus side. Host to PCI bus bridge local clock buffering would also be included in the alternative embodiment to eliminate any need for an external Phase Lock Loop (PLL) type clock buffering of a host clock. Further, 64 bit wide data paths within the PCI bus bridge 110 to accommodate future PCI interface device improvements.

Figure 3:
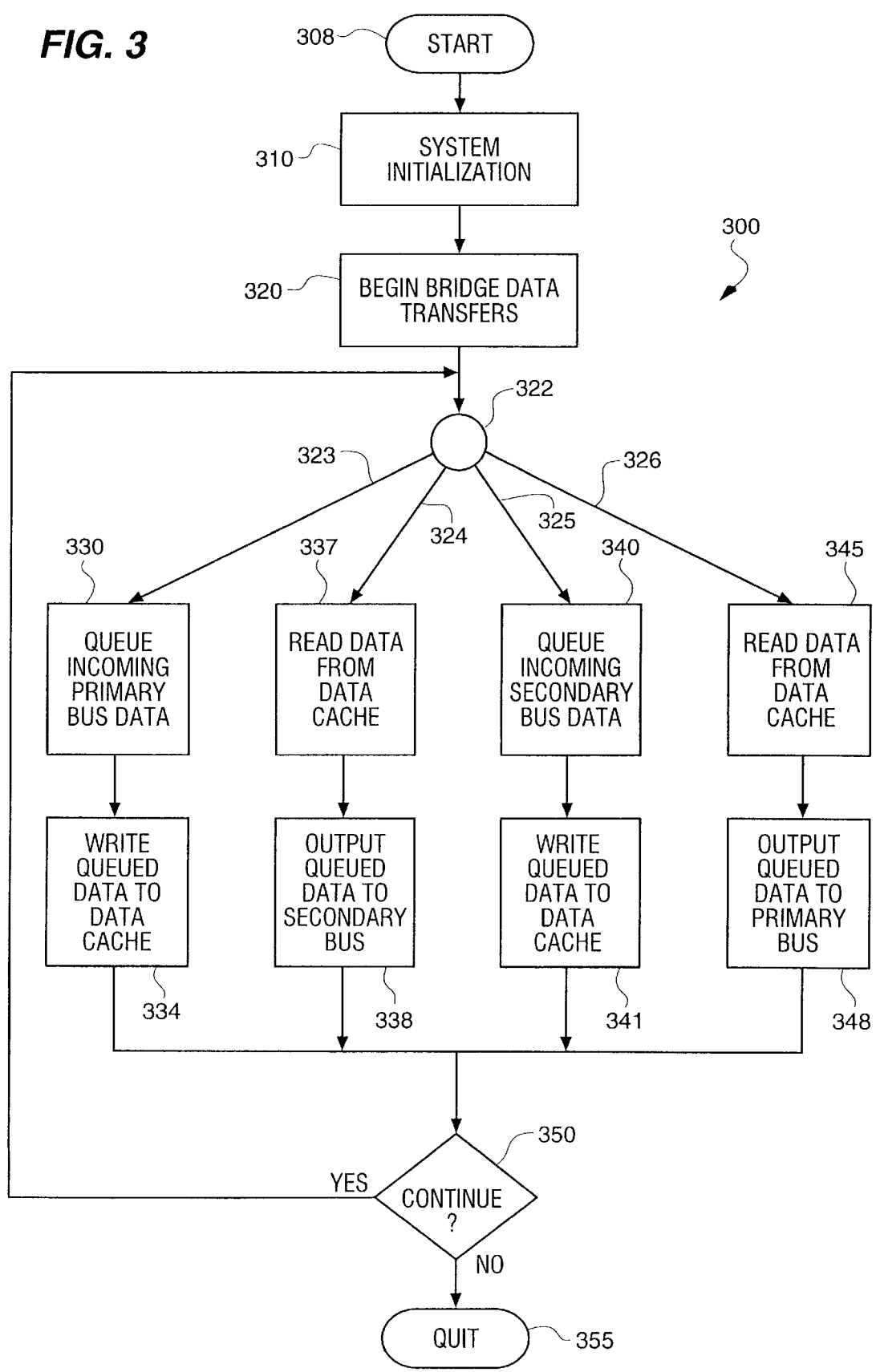
FIG. 3 illustrates an overview of the enhanced I/O bus bridge operational steps in flow diagram form.

Enhanced I/O Bus Bridge Operational Steps—FIG. 3

FIG. 3 illustrates the high level operational steps 300 of the enhanced I/O bus bridge 110 in flow diagram form. The operational steps 300 begin at step 308 and proceed to I/O bus system initialization at step 310. I/O bus system initialization typically occurs once when the host system power is recycled and can be repeated as needed during higher level fault recovery. Components affected during initialization can include but are not limited to any combination of the primary and secondary busses, the enhanced I/O bus bridge, and the data cache, and the combinations can vary depending on the level of initialization.

At step 320 like-bus to like-bus data transfers can begin across the enhanced I/O bus bridge 110. The data transfers to and from either a primary bus and a secondary bus across the enhanced I/O bus bridge 110 are asynchronous and can occur simultaneously in opposite directions. Depending on the specific transaction type, the master origin, and the slave destination, the asynchronous and simultaneous operations separate at branch point 322.

Branches 323 and 324 represent a data transfer from a primary bus to a secondary bus such as primary PCI bus 130 and secondary PCI bus 140 for example. At step 330 in branch 323, data from the primary bus 130 is queued (242) as incoming data to the first data path 112 until all or a complete block of data is received. At step 334 the command interpreter 117 moves the queued data in a block write to the data cache 220. If at decision step 350 it is determined that processing will continue, then processing continues at branch point 322. At step 337 in branch 324, the command interpreter 117 executes at least one block read from data cache 220 to an output queue 251 on the second data path 113. At step 338 the queued data is output to the secondary bus 140. If at decision step 350 it is determined that processing will continue, then processing continues at branch point 322. Although for a specific block of data the steps in branches 323 and 324 must occur in sequence, the branch 323 and 324 steps are continuously and simultaneously occurring for a variety of data transactions crossing the enhanced I/O bus bridge 110 from the primary bus 130 source to the secondary bus 140 destination.

Concurrently with the asynchronous and simultaneous operations of the branch 323 and 324 steps, the steps of branches 325 and 326 are continuously and simultaneously occurring in an asynchronous manner for a variety of data transactions crossing the enhanced I/O bus bridge 110 from the secondary bus 140 source to the primary bus 130 destination. At step 340 in branch 325, data from the secondary bus 140 is queued (252) as incoming data to the second data path 113 until all or a complete block of data is received. At step 341 the command interpreter 117 moves the queued data in a block write to the data cache 220. If at decision step 350 it is determined that processing will continue, then processing continues at branch point 322. At step 345 in branch 326, the command interpreter 117 executes at least one block read from data cache 220 to an output queue 241 on the first data path 112. At step 348 the queued data is output to the primary bus 130. If at decision step 350 it is determined that processing will continue, then processing continues at branch point 322. Alternatively, if at decision step 350 it is determined that processing will not continue then processing stops at step 355.

Summary

The enhanced dual port I/O bus bridge supports concurrent bi-directional data transactions across an I/O bus bridge by way of dual port memory access to a single shared data cache. The data transactions occur simultaneously in a manner that results in an I/O bus bridge bandwidth capacity of at least that of the attached primary and secondary busses and typically at twice to four times the primary and secondary bus bandwidth. Although specific embodiments are disclosed herein, it is expected that persons skilled in the art can and will make, use, and/or sell alternative enhanced dual port I/O bus bridges that are within the scope of the following claims either literally or under the Doctrine of Equivalents.

What is claimed is:

1. An I/O bus bridge system for bridging a first I/O bus, and a second I/O bus, the system comprising: a first bridge interface and a second bridge interface; the first bridge interface for operational connection to the first I/O bus and the second bridge interface for operational connection to the second I/O bus; a data cache; a first data access path between the first bridge interface and the data cache, the first access path having at least one first path buffer to store incoming or outgoing primary bus data; a second data access path between the second bridge interface and the data cache, the second access path having at least one second path buffer to store incoming or outgoing secondary bus data; and means for controlling simultaneous bi-directional data flow between the first bridge interface and the second bridge interface by way of the data cache.

2. The system of claim 1, including: a memory interface between the data cache and both of the first data access path and the second data access path; a reading means and a writing means in the memory interface that can concurrently read and write data to the data cache; a command path between the first bridge interface and the second bridge interface; and means for interpreting data transfer commands on the command path that are indicative of at least one I/O bus bridge command selected from a group consisting of: a read command, a write command, and an administrative command.

3. The system of claim 2, including a command interpreter means to control the reading means and the writing means according to the data transfer commands.

4. A system according to claim 3, including means for arbitrating activity among the memory interface, the command interpreter means, the first bridge interface, and the second bridge interface.

5. The system of claim 1, wherein the data cache includes a limited access dual port RAID data cache for use only by way of the first data access path and the second data access path.

6. The system of claim 1, wherein the data cache includes a shared access dual port RAID data cache for use by multiple devices not directly affiliated with the I/O bridge system.

7. The system of claim 1, wherein the at least one first path buffer stores both incoming and outgoing primary bus data.

8. The system of claim 1, wherein the at least one first path buffer is a data queue.

9. The system of claim 1, wherein the at least one first path buffer includes a first path incoming data queue and a first path outgoing data queue, and the first path buffer stores both incoming and outgoing primary bus data.

10. The system of claim 9, wherein the first and second I/O busses operate at bandwidth B, and the first and second data access paths operates at least at a bandwidth of 2B.

11. The system of claim 1, wherein the first I/O bus operates at bandwidth B, and the first data access path operates at least at a bandwidth of 2B.

12. A method for operating an I/O bus bridge for bridging a first I/O bus and a second I/O bus, the I/O bus bridge includes a first bridge interface for operational connection to the first I/O bus, a second bridge interface for operational connection to the second I/O bus, a data cache, a first data access path between the first bridge interface and the data cache, and a second data access path between the second bridge interface and the data cache, wherein the first data access path has a first data path incoming primary data queue and a first data path outgoing primary data queue and the second data access path has a second data path incoming secondary data queue and a second data path outgoing secondary data queue, the method comprising: simultaneously transferring bi-directional data traffic between the first bridge interface and the second bridge interface by way of the first data access path and the second data access path concurrently to a shared one of the data cache.

13. The method of claim 12, including: establishing a command path between the first bridge interface and the second bridge interface; interpreting data transfer commands on the command path that are indicative of at least one I/O bus bridge command selected from a group consisting of: a read command, a write command, and an administrative command; and executing commands from the command path by a command interpreter means to control the reading means and the writing means according to the data transfer commands.

14. The method of claim 13, including: arbitrating activity among the memory interface, the command interpreter, the first bridge interface, and the second bridge interface.

15. The method of claim 12, including: queuing incoming primary bus data to the first data path incoming primary data queue; reading outgoing secondary bus data from the data cache and queuing outgoing secondary bus data to the second data path outgoing secondary data queue; queuing incoming secondary bus data to the second data path incoming secondary data queue; reading outgoing primary bus data from the data cache and queuing outgoing primary bus data to the first data path outgoing primary data queue; writing queued data in the first data path incoming primary data queue to the data cache; outputting queued outgoing secondary bus data to the secondary bus; and writing queued data in the second data path incoming secondary data queue to the data cache; outputting queued outgoing primary bus data to the secondary bus.

16. The method of claim 15, wherein the following steps are concurrently performed: queuing incoming primary bus data to the first data path incoming primary data queue; reading outgoing secondary bus data from the data cache and queuing outgoing secondary bus data to the second data path outgoing secondary data queue; queuing incoming secondary bus data to the second data path incoming secondary data queue; and reading outgoing primary bus data from the data cache and queuing outgoing primary bus data to the first data path outgoing primary data queue are concurrently performed.

17. The method of claim 16, wherein the following steps are concurrently performed: writing queued data in the first data path incoming primary data queue to the data cache; outputting queued outgoing secondary bus data to the secondary bus; writing queued data in the second data path incoming secondary data queue to the data cache; and outputting queued outgoing primary bus data to the secondary bus.

18. An PCI-to-PCI bridge system for bridging a primary PCI bus and a secondary PCI bus, the system comprising: a first bridge interface and a second bridge interface; the first bridge interface for operational connection to the primary PCI bus and the second bridge interface for operational connection to the secondary PCI bus; a dual port data cache; a first data access path between the first bridge interface and a first port of the dual port data cache, the first access path having at least one first path buffer to store incoming or outgoing primary bus data; a second data access path between the second bridge interface and a second port of the dual port data cache, the second access path having at least one second path buffer to store incoming or outgoing secondary bus data; a memory interface between the dual port data cache and both of the first data access path and the second data access path; a reading means and a writing means in the memory interface that can concurrently read and write data to the dual port data cache; a command path between the first bridge interface and the second bridge interface; means for interpreting data transfer commands on the command path that are indicative of at least one PCI-to-PCI bridge command selected from a group consisting of: a read command, a write command, and an administrative command; and means for controlling simultaneous bi-directional data transmissions between the first bridge interface and the second bridge interface by way of the dual port data cache.

19. The system of claim 18, including: the dual port data cache is a dual port RAID cache; a direct memory access engine; and means for mastering data traffic directly to the primary PCI bus from the dual port RAID cache.

20. The system of claim 18 including means for uninterruptedly supplying backup power to the PCI-to-PCI bridge and the dual port data cache absent a primary power source.

* * * * *